United States Patent
Tanaka

[19]

[11] Patent Number: 5,868,196
[45] Date of Patent: Feb. 9, 1999

[54] MOUNTING BRACKET FOR HEAT EXCHANGER

[75] Inventor: Hiroshi Tanaka, Gunma, Japan

[73] Assignee: Sanden Corporation, Gunma, Japan

[21] Appl. No.: 5,767

[22] Filed: Jan. 12, 1998

[30] Foreign Application Priority Data

Jan. 17, 1997 [JP] Japan .................................. 9-019712

[51] Int. Cl.$^6$ ............................................ F28F 9/00
[52] U.S. Cl. ............................ 165/67; 180/68.4; 228/183
[58] Field of Search ............... 165/67; 180/68.4; 228/183

[56] References Cited

U.S. PATENT DOCUMENTS

| | | | |
|---|---|---|---|
| 5,183,103 | 2/1993 | Tokutake | 165/67 |
| 5,205,349 | 4/1993 | Nagao et al. | 165/67 |
| 5,685,364 | 11/1997 | Harris | 165/67 |

FOREIGN PATENT DOCUMENTS

| | | | |
|---|---|---|---|
| 4-353396 | 12/1992 | Japan | 165/67 |
| 5-45087 | 2/1993 | Japan | 165/67 |

*Primary Examiner*—Allen Flanigan
*Attorney, Agent, or Firm*—Baker & Botts, L.L.P.

[57] ABSTRACT

A mounting bracket for a heat exchanger is connected to a heat exchanger body by brazing. The bracket has a first surface connected to the heat exchanger body, a second surface connected to an external member and a pin projecting from the second surface for positioning the bracket relative to the external member. A hole is formed in the first surface of the bracket and this hole is in communication with a bracket portion securing the pin to enable a brazing material to flow from the first surface to the pin securing bracket portion through the hole. The separation between the first and second surfaces is reduced, and the overall size of the bracket is reduced. By the reduction of the size of the bracket, the space required for installation of the heat exchanger may be reduced, or the area of the core portion of the heat exchanger body may be increased even in a limited space.

11 Claims, 3 Drawing Sheets

MOUNTING BRACKET FOR HEAT EXCHANGER

BACKGROUND OF THE INVENTION

1. Field of the Invention

The present invention relates to a mounting bracket for mounting a heat exchanger on an external member, and more particularly, to an improved mounting bracket for a heat exchanger suitable for a situation in which space for mounting is limited, for example, for a heat exchanger used in automobiles.

2. Description of the Related Art

An example of a known bracket structure 100 for mounting a heat exchanger on an external member 107 is shown in FIG. 8. In FIG. 8, a heat exchanger body 101 has a header pipe 102, and a bracket 103 is connected to header pipe 102 by brazing. Bracket 103 comprises a bracket body 103a and a pin 103b projected from bracket body 103a for positioning bracket body 103a relative to an external member, for example, a frame or a member of an automobile or a rubber cushion 107. Pin 103b is fixed to bracket body 103a by welding or brazing. Bracket body 103a is formed, for example, by the pressing of a plate or by extrusion.

In bracket structure 100, pin 103b is fixed to bracket body 103a after pin 103b is inserted into a hole 104 provided in bracket body 103a. Because space for inserting pin 103b into hole 104 and working space for welding or brazing inserted pin 103b are required for bracket structure 100, a separation "a" must be maintained between a surface 105 of bracket body 103a connected to header pipe 102 and a surface 106 of bracket body 103a connected to an external member 107. Moreover, when bracket body 103a is formed by the pressing of a plate, the plate must be bent in a curved form along the surface of header pipe 102. Because a sufficient working space must be present for this pressing, it is also necessary that the dimension "a" is maintained at a sufficiently large value. Thus, the permissible reduction in dimension "a" is limited in the known bracket structure 100.

In a situation in which space for installation of a heat exchanger is limited, for example, in the situation of heat exchanger installation in automobiles, it is desirable to ensure that the area of the core portion of the heat exchanger is as large as possible, thereby increasing the heat exchange performance of the heat exchanger as much as possible. However, when a reduction of separation "a" between surfaces 105 and 106 is limited, as described above, the increase of the heat exchange performance is also limited.

SUMMARY OF THE INVENTION

It is an object of the present invention to provide an improved bracket structure for mounting a heat exchanger which may reduce the separation between the surface connected to a heat exchanger body and the surface connected to an external member, thereby enlarging the area of a core portion of a heat exchanger despite limitation of the space for installation of the heat exchanger.

It is another object of the present invention to provide an improved bracket structure for mounting a heat exchanger which may improve the reliability of brazing for fixing a pin used for positioning a mounting bracket relative to an external member.

To achieve the foregoing and other objects, the structure of a mounting bracket according to the present invention is herein provided. The mounting bracket is connected to a heat exchanger body of a heat exchanger, for example, by brazing. The bracket has a first surface connected to the heat exchanger body, a second surface connected to an external member, and a pin projecting from the second surface for positioning the bracket relative to the external member. A hole is formed in the first surface of the bracket and is in communication with a bracket portion securing the pin so as to enable a brazing material to flow from the first surface to the pin securing bracket portion through the hole.

In the bracket structure, it is preferred that a brazing condition recognizing portion is provided on the pin securing bracket portion, so that the status of the brazing may be observed from the bracket's exterior. The pin may be temporarily secured prior to brazing. The temporary securing of the pin may be performed by caulking or spot welding.

The pin may be inserted into an attachment hole provided in the bracket. In order to set an insertion depth of the pin into the attachment hole or a projection length of the pin from the second surface to a desired length, the pin may have an engaging portion for regulating an insertion depth of the pin into the attachment hole, or the attachment hole may have an engaging portion for regulating an insertion depth of the pin into the attachment hole.

Although materials for forming the heat exchanger body and the bracket are not particularly restricted, at least a portion of the heat exchanger body connected to the first surface of the bracket may be composed of a material coated with a brazing material.

Further, the position of attachment of the bracket on the heat exchanger body is not particularly restricted. For example, when the heat exchanger has a header pipe, the first surface of the bracket may be connected to a surface of the header pipe.

In addition, the type of the heat exchanger is not limited. For example, the present invention is suitable for use in a multi-flow type heat exchanger comprising a pair of header pipes and a plurality of heat transfer tubes interconnecting the pair of header pipes. In such a multi-flow type heat exchanger, the bracket may be connected to each of the pair of header pipes.

In the bracket structure according to the present invention, a brazing material easily flows from the first surface (for example, from the header pipe of the heat exchanger) into the pin securing bracket portion through the hole formed in the first surface during brazing of the heat exchanger body. Therefore, the brazing of the heat exchanger body and the brazing of the pin may be performed substantially simultaneously. In particular, when the portion of the heat exchanger body connected to the first surface is composed of a brazing material-coated material, the brazing material may flow naturally into the pin securing bracket portion. As a result, because a working space for securing a pin by welding or brazing in advance is not necessary, the separation between the first and second surfaces of the bracket may be decreased. The overall size of the bracket may be reduced, and ultimately, the area of the core portion of the heat exchanger may be enlarged even if the space for installation of the heat exchanger is limited.

Moreover, because it is not necessary that the pin is fixed to the bracket by welding or brazing prior to the attachment to the heat exchanger body and because the pin may be brazed to the bracket substantially simultaneously with the brazing of the assembly of the heat exchanger body in a furnace, the manufacturing cost for the heat exchanger assembly including the bracket may be reduced.

Further, when a brazing condition recognizing portion is provided, the brazing condition of the pin may be readily observed from the exterior of the bracket, thereby increasing the reliability of the brazing.

Further objects, features, and advantages of the present invention will be understood from the following detailed description of the preferred embodiments of the present invention with reference to the accompanying figures.

BRIEF DESCRIPTION OF THE DRAWINGS

Embodiments of the invention are now described with reference to the accompanying figures, which are given by way of example only, and are not intended to limit the present invention.

DETAILED DESCRIPTION OF PREFERRED EMBODIMENTS

Figure 1:
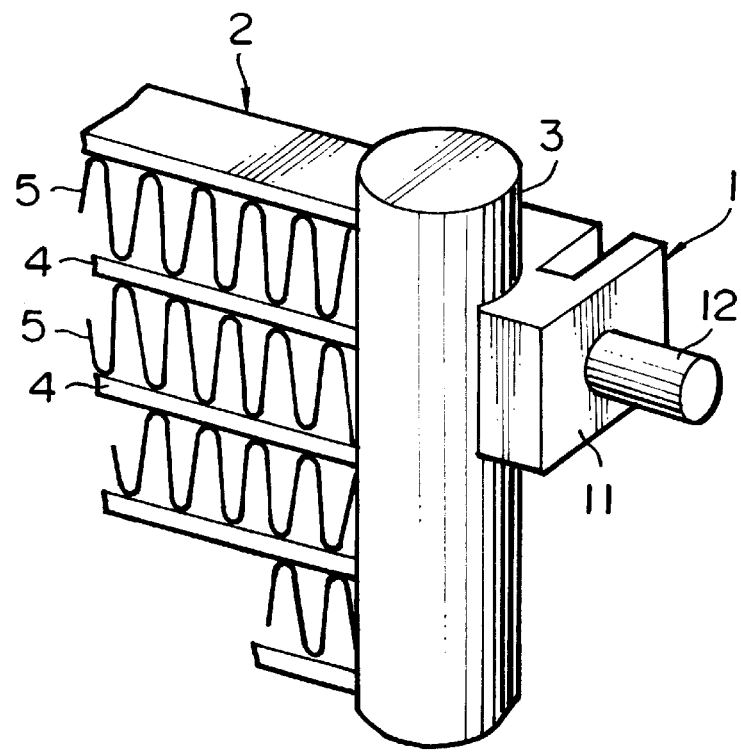
FIG. 1 is a partial, perspective view of a heat exchanger connected with a mounting bracket according to a first embodiment of the present invention.
Figure 2:
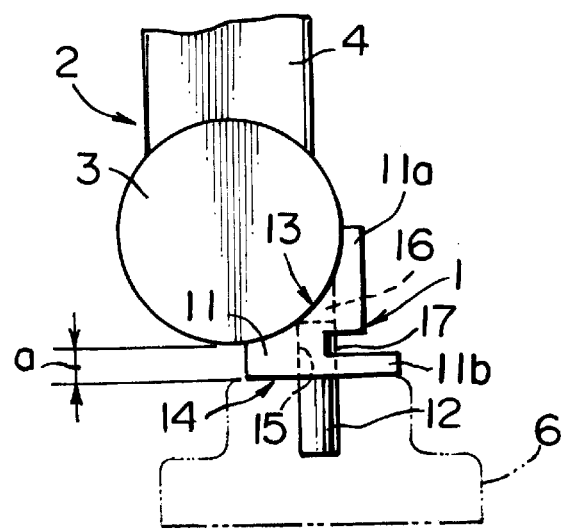
FIG. 2 is an overhead view of the heat exchanger depicted in FIG. 1.

Referring to FIGS. 1 to 5, a mounting bracket 1 for a heat exchanger is provided according to a first embodiment. Heat exchanger body 2 is mounted to an external member 6 (FIG. 2) via bracket 1. Heat exchanger body 2 includes a pair of header pipes 3 (in the figure, only one header pipe 3 is depicted.). A plurality of heat transfer tubes 4 (for example, flat-type refrigerant tubes) fluidly interconnect the pair of header pipes 3. Corrugated fin 5 is interposed between heat transfer tubes 4. Thus, the heat exchanger is constructed as a multi-flow type heat exchanger.

Bracket 1 is connected to header pipe 3 of heat exchanger body 2 by brazing. Header pipe 3 is composed of a material coated with a brazing material, for example, an aluminum alloy coated with a brazing material. Utilizing this brazing material, bracket 1 is brazed to header pipe 3 as described below.

Bracket 1 comprises a bracket body 11 and a pin 12 for positioning bracket body 11 of heat exchanger body 2 relative to an external member, for example, rubber cushion 6, or a frame or a member of an automobile. Bracket body 11 has a curved first surface 13 connected to header pipe 3 of heat exchanger body 2 and a second surface 14 connected to external member 6. Bracket body 11 is formed integrally with a header pipe side portion 11a forming first surface 13 and an external member side portion 11b forming second surface 14. Bracket body 11 includes a pin attachment hole 15. Pin 12 is inserted into pin attachment hole 15 to a predetermined depth, and the remaining portion of pin 12 projects from second surface 14 toward the exterior of bracket body 11 to permit connection to external member 6 and to position bracket body 11 at a predetermined position in relation to external member 6. Bracket body 11 and pin 12 are constructed, for example, from aluminum or an aluminum alloy, and they may be formed by extrusion.

A hole 16 enabling a brazing material to flow from first surface 13 (header pipe side) to the pin securing bracket portion in pin attachment hole 15 is formed in first surface 13 to place hole 16 in communication with the pin securing bracket portion. This hole 16 may be readily formed, for example, by merely pressing a tip of a tool for hole processing by pressing, drilling, or end milling against first surface 13 and penetrating first surface 13 to produce hole 16 therein, at the time of processing of pin attachment hole 15 from the side of second surface 14.

In this embodiment, pin attachment hole 15 is partially opened toward the exterior of bracket body 11 at an intermediate portion in the axial direction, i.e., at a central portion of bracket body 11 between header pipe side portion 11a and external member side portion 11b. This partially opened portion forms a brazing condition recognizing portion 17 exposed to the exterior of bracket body 11 for recognizing the brazing condition of pin 12.

Figure 3:
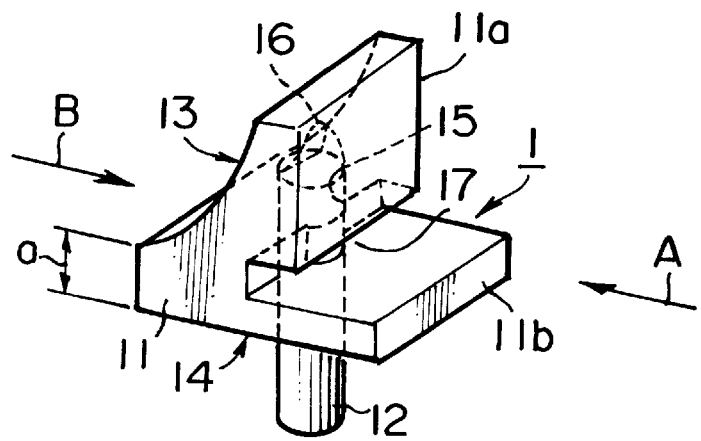
FIG. 3 is a perspective view of the bracket depicted in FIG. 1.
Figure 4:
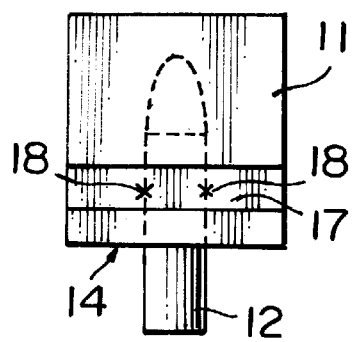
FIG. 4 is a side view of the bracket depicted in FIG. 3 as viewed in the direction of arrow A of FIG. 3.
Figure 5:
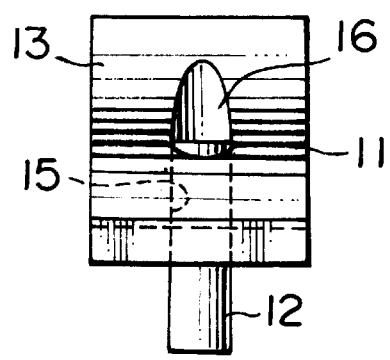
FIG. 5 is a side view of the bracket depicted in FIG. 3 as viewed in the direction of arrow B of FIG. 3.

FIGS. 4 and 5 depict side views of bracket 1 of FIG. 3 as viewed in the respective directions of arrows A and B of FIG. 3. In this embodiment, although the insertion depth of pin 12 into pin attachment hole 15 is regulated by bringing the tip of pin 12 into contact with the outer surface of header pipe 3, pin 12 may be temporarily secured in pin attachment hole 15 prior to the brazing of heat exchanger body 2. For example, pin 12 may be temporarily secured at appropriate positions 18 in brazing condition recognizing portion 17 by caulking or spot welding, as depicted in FIG. 4. In such a temporary securing, the insertion depth of pin 12 into pin attachment hole 15 may be set substantially freely.

In the first embodiment thus constituted, hole 16 is formed in first surface 13 of bracket body 11 that is connected to header pipe 3, and this hole 16 is in communication with pin attachment hole 15. When heat exchanger body 2 and bracket 1 are assembled and the assembly is brazed in a furnace, the brazing material flows naturally from the surface of header pipe 3 into pin attachment hole 15 through hole 16. The brazing material flows into the pin securing bracket portion in pin attachment hole 15 to braze and fix pin 12 to bracket body 11. Therefore, it is not necessary to braze or weld pin 12 to bracket body 11 in advance, thereby simplifying the manufacturing process and reducing the manufacturing cost.

Because a working space for connecting pin 12 to bracket body 11 in advance is not necessary, separation "a" (FIG. 2) between first surface 13 and second surface 14 may be significantly reduced, and the entire size of bracket body 11 may be reduced. This reduction of separation "a" and the entire size of bracket body 11 may result in an enlargement of the area of the core portion of heat exchanger body 11, even if a space for installation of the heat exchanger is limited.

Moreover, because bracket body 11 may be made by extrusion, a space for processing of curved first surface 13, for example, by pressing, also is not necessary. From this point of view, separation "a" may be significantly reduced.

Thus, the reduction of separation "a" may result in the reduction of the space required for installation of the heat exchanger or the enlargement of the area of the core portion of the heat exchanger in a limited space for installation. Therefore, the present invention is useful particularly for a heat exchanger used in automobiles.

Further, in the embodiment described above, because brazing condition recognizing portion 17 is provided, the brazing condition of pin 12 may be readily observed from the exterior of bracket body 11, thereby significantly increasing the reliability of the brazing.

Figure 6A:
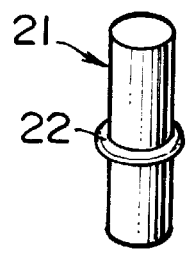
FIG. 6A is a perspective view of a pin with an engaging portion.
Figure 6B:
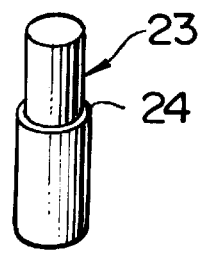
FIG. 6B is a perspective view of another embodiment of the pin with an engaging portion according to a second embodiment of the present invention.

FIGS. 6A and 6B depict variations of the structure of a pin according to a second embodiment of the present invention. In FIG. 6A, a flange portion 22 protrudes radially outward on the periphery of pin 21 and functions as an engaging portion. In FIG. 6B, a stepped portion 24 is formed as an engaging portion on the periphery of pin 23. Each of these engaging portions 22 and 24 is brought into contact with second surface 14 of bracket body 11 to regulate the insertion depth of pin 21 or 23. In these structures, the projection length of pin 21 or 23 is also regulated.

Figure 7:
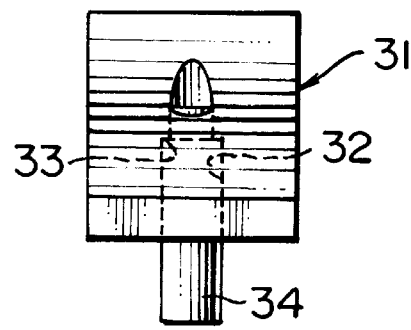
FIG. 7 is an elevational view of a bracket having a pin attachment hole with an engaging portion according to a third embodiment of the present invention.
Figure 8:
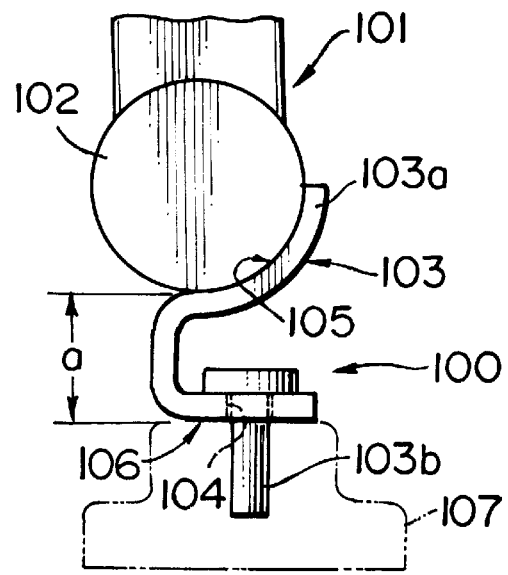
FIG. 8 is an overhead view of a known bracket structure for a heat exchanger.

FIG. 7 depicts a structure of a pin attachment hole according to a third embodiment of the present invention. In FIG. 7, an engaging portion 33 formed as a stepped portion is provided in pin attachment hole 32. The tip of pin 34 is inserted into pin attachment hole 32 and engages engaging portion 33, thereby regulating the insertion depth of pin 34.

Although the structure for attaching a bracket to a header pipe has been explained in the above-described first, second, and third embodiments, such a bracket may be brazed to any portion of a heat exchanger body other than a header pipe. Further, the bracket structure according to the present invention may be applied to heat exchangers other than a multi-flow type heat exchanger.

Although several embodiments of the present invention have been described in detail herein, the scope of the invention is not limited thereto. It will be appreciated by those skilled in the art that various modifications may be made without departing from the scope of the invention. Accordingly, the embodiments disclosed herein are only exemplary. It is to be understood that the scope of the invention is not to be limited thereby, but is to be determined by the claims which follow.

What is claimed is:

1. In a mounting bracket for a heat exchanger connected to a heat exchanger body of said heat exchanger, said bracket comprising a first surface connected to said heat exchanger body, a second surface connected to an external member, and a pin projecting from said second surface for positioning said bracket relative to said external member, wherein a hole is formed in said first surface of said bracket and is in communication with a bracket portion securing said pin to enable a brazing material to flow from said first surface to said pin securing bracket portion through said hole.

2. The mounting bracket for a heat exchanger of claim 1, wherein a brazing condition recognizing portion is provided on said pin securing bracket portion.

3. The mounting bracket for a heat exchanger of claim 1, wherein said pin is temporarily secured prior to brazing.

4. The mounting bracket for a heat exchanger of claim 3, wherein said pin is temporarily secured by a method selected from the group consisting of caulking and spot welding.

5. The mounting bracket for a heat exchanger of claim 1, wherein said pin is inserted into an attachment hole provided in said bracket.

6. The mounting bracket for a heat exchanger of claim 5, wherein said pin has an engaging portion for regulating an insertion depth of said pin into said attachment hole.

7. The mounting bracket for a heat exchanger of claim 5, wherein said attachment hole has an engaging portion for regulating an insertion depth of said pin into said attachment hole.

8. The mounting bracket for a heat exchanger of claim 1, wherein said heat exchanger has a header pipe, and said first surface of said bracket is connected to a surface of said header pipe.

9. The mounting bracket for a heat exchanger of claim 1, wherein at least a portion of said heat exchanger body connected to said first surface is composed of a material coated with said brazing material.

10. The mounting bracket for a heat exchanger of claim 1, wherein said heat exchanger is a multi-flow type heat exchanger comprising a pair of header pipes and a plurality of heat transfer tubes interconnecting said pair of header pipes.

11. The mounting bracket for a heat exchanger of claim 10, wherein said bracket is connected to each of said pair of header pipes.

\* \* \* \* \*